United States Patent [19]

Cicenas

[11] Patent Number: 4,996,785
[45] Date of Patent: Mar. 5, 1991

[54] HANGER FOR FLAT FILM MEDIA

[75] Inventor: Chris W. Cicenas, Hilliard, Ohio

[73] Assignee: Picker International, Inc., Highland Heights, Ohio

[21] Appl. No.: 410,730

[22] Filed: Sep. 21, 1989

[51] Int. Cl.⁵ .............................................. G02B 27/02
[52] U.S. Cl. .......................................... 40/361; 24/545
[58] Field of Search ...................... 211/45, 89; 40/361, 40/367; 248/316.7; 24/545, 555, 563, 67.11

[56] References Cited

U.S. PATENT DOCUMENTS

| | | | |
|---|---|---|---|
| 1,803,631 | 5/1931 | Mabee | 40/361 |
| 2,549,200 | 4/1951 | Hooks | 248/316.7 |
| 3,896,576 | 7/1975 | Wolf et al. | 40/367 |
| 4,010,517 | 3/1977 | Kapstad | 211/89 |
| 4,071,883 | 1/1978 | Dennis | 362/97 |
| 4,510,708 | 4/1985 | Pokrinchak | 40/361 |
| 4,527,347 | 7/1985 | Ohison | 40/361 |
| 4,563,796 | 1/1986 | Kettlestrings | 24/563 |
| 4,691,267 | 9/1987 | Giesberg | 362/218 |
| 4,698,930 | 10/1987 | McNair | 40/361 |

Primary Examiner—Kenneth J. Dorner
Assistant Examiner—J. Bonifanti
Attorney, Agent, or Firm—Fay, Sharpe, Beall, Fagan & McKee

[57] ABSTRACT

Light box assembly (10) has a removably mountable viewing panel (30), a cabinet (20), and a film media hanging means (40). Upon insertion, the viewing panel (30) is maintained in position by pressure applied by a stopping surface (70) a second surface opposite a camming surface (60) of an arm (62), along with a bottom panel positioner (72). Naturally resilient film (52) is inserted into a film receiving means (50). The film is guided along a guide surface (74) such that the leading edge of the film (52) follows the camming surface (60). Upon reaching film receiving bight (66), the operator releases the film. Due to the film's natural resiliency and the relative positions of the film receiving bight (66), the engaging edge (58), and an outer edge of the viewing panels' notch (32), the film is maintained in a secured position without the need of any moving parts. Such a configuration allows films of various thickness is to be secured.

15 Claims, 1 Drawing Sheet

HANGER FOR FLAT FILM MEDIA

BACKGROUND OF THE INVENTION

The present invention relates to displaying film flexible articles. The invention is particularly applicable to the hanging of x-ray films to the illuminated translucent panel of a light box and will be described with particular reference thereto. It is to be appreciated that the invention will also find application for hanging other sheet material.

In order for doctors to view the images contained on the thin flexible x-ray film, various film illuminators or light boxes have been developed. These film illuminators have a translucent front panel mounted in front of fluorescent or incandescent lamps. Light from the lamp is diffused through the front panel backlighting the x-ray film to facilitate inspection of the x-ray film.

In order to maintain the x-ray film in a fixed position against the illuminated viewing screen, various mounting apparatus's and techniques have been developed. Commonly, a spring clip is mounted at the top of the light box. U.S. Pat. No. 4,698,930 discloses other devices for hanging film that proport to be an improvement over the common spring clip. The first embodiment uses a horizontally recessed groove located on a vertical surface, the bottom of the groove has a ridge extending in an upward fashion. A cover for the groove has a mantle portion the leading edge of which is bent in a downward direction fitting over the top of the ridge and resting on the ridges' backside. The cover is a weighted material which rests on the vertical surface along the bottom edge of the groove. Holding an object in the embodiment, requires urging the cover in an upward fashion and slipping the object between the bottom edge and the vertical surface. Thereafter, the cover is allowed to come back to its resting point pinching the object and holding it fast.

The second embodiment disclosed in U.S. Pat. No. 4,698,930 includes a recessed groove, located within the groove is a horizontally extending pin or pintle which is the mounting means used to effect pivoting of a front cover. In this manner, the cover pivots upon the pin or pintle in the groove creating a space between the bottom edge of the vertical surface. An object is introduced into the space and thereafter the front cover pivots down and holds the object.

Yet a third embodiment, disclosed in U.S. Pat. No. 4,698,930 uses a rounded recessed groove. The inside of the groove is curved in such a manner that a ball placed in the groove rests naturally at a point in the groove between the bottom of the groove and the backside of the front cover. The bottom of the groove slopes downward and forward providing a track for the ball, placing the ball in close proximity to the bottom edge of the front cover. The object held is slipped into the space between the bottom of the front cover and the vertical wall whereupon the ball weighs down the top of the object.

U.S. Pat. No. 4,527,347 shows yet another manner in which gripping of a thin film x-ray is accomplished. A resilient member comprising an anchoring portion, a thinner hinge or pivoting means, and an engaging portion having a pointed portion are used to hold the x-ray film. The engaging portion is supported by a lower horizontal or slightly upwardly sloping part of a profiled frame element. The rear surface of the anchoring portion is fixed to the inner surface of the vertically extending part of the profiled frame element. An inserted x-ray film results in the engaging portion of the resilient member being deflected or bent upwardly, in this manner, the x-ray is held as a result of the pressure exerted when the engaging portion is compressed in its length direction.

A disadvantage with these prior art film hangers is that the film engaging portions require moving parts to hold the x-ray film. This creates the potential for mechanical breakdown of the moving parts, eventually requiring their removal and replacement. Removal of such an integrated piece of the film illuminator is accomplished with great difficulty.

Furthermore, x-ray films are often observed immediately after being processed. The film surface is frequently still damp or soft from the developing chemicals. In using the prior art described, the developing chemicals softened emulsion from the film tend to accumulate within the gripping or fixing sections of these devices. This build-up causes a degradation in the fixing or gripping ability of these devices. Further, the accumulated emulsion tends to stick the gripper to the film impeding release. Therefore, it becomes necessary to either replace or clean the device. This cleaning is difficult due to the inaccessibility of the location needed to be cleaned.

Yet another drawback to the known art is that they do not securely hold sheets of varying thicknesses. Specifically, the prior art apparatae use moving parts, one of such parts being pressed against another part, to secure and hold the sheet. However, when thick and thin sheets are pressed between the same moving parts only the thicker sheet is engaged thereby causing poor, or no holding pressure to the thinner sheet.

The subject invention contemplates a new and improved sheet hanging apparatus that overcomes all of the above referenced problems and others.

SUMMARY OF THE INVENTION

In accordance with one aspect of the present invention, a light box assembly is provided for viewing film media. A cabinet which holds a light source has a generally open front for receiving a translucent viewing panel. The viewing panel is mounted in the generally open front of the cabinet by a viewing panel mounting means. A film media hanging means releasably hangs a sheet of naturally resilient film along a front face of the viewing panel. The film media hanging means includes an engaging edge disposed adjacent to one edge of the viewing panel positioned generally in a plane of the viewing panel. A camming surface is disposed adjacent to the viewing panel for camming a leading edge of the naturally resilient film sheet. The film sheet is inserted, generally parallel to the viewing panel, into the hanging means, such that after insertion the natural resiliency of the film sheet urges the film sheet into a firm functional engagement with the engaging edge.

In accordance with another aspect of the present invention, a film hanger apparatus is provided. The apparatus includes a viewing device which has a cabinet and a viewing panel. A rigid uni-body extrusion holds an x-ray film. The extrusion includes a fixed leg having a "J" shaped configuration in cross section extending outward from the x-ray viewing device. The lower section of the leg hooks generally towards the x-ray viewing device, terminating in an engaging edge which is directed towards the x-ray viewing device. A securing section secures the extrusion to the x-ray viewing device.

In accordance with yet another aspect of the present invention, a film hanger for a film viewing device is provided. The film hanger is a uni-body extrusion. The extrusion includes a securing section so that the uni-body extrusion may be secured to the film viewing device. A biasing section having an engaging edge is disposed adjacent to one edge of the viewing panel. A camming section is disposed adjacent to the viewing panel. One edge of the camming surface is used for camming a leading edge of a naturally resilient sheet of film as the sheet of film is inserted, generally parallel, into the viewing panel. A film receiving bight is formed at an area of connection between the biasing section and the camming section. The film receiving bight receives the leading edge of the naturally resilient film. The film receiving bight is positioned in a non-aligned relationship to the biasing means such that after insertion, the film is held in a curved position. A bridge section is provided for connecting the securing section and the film receiving bight.

BRIEF DESCRIPTION OF THE DRAWINGS

The invention may take form in various parts and arrangement of parts or in various steps and arrangement of steps. The drawings are only for purposes of illustrating a preferred embodiment and are not to be construed as limiting the invention.

DETAILED DESCRIPTION OF THE PREFERRED EMBODIMENT

Figure 1:
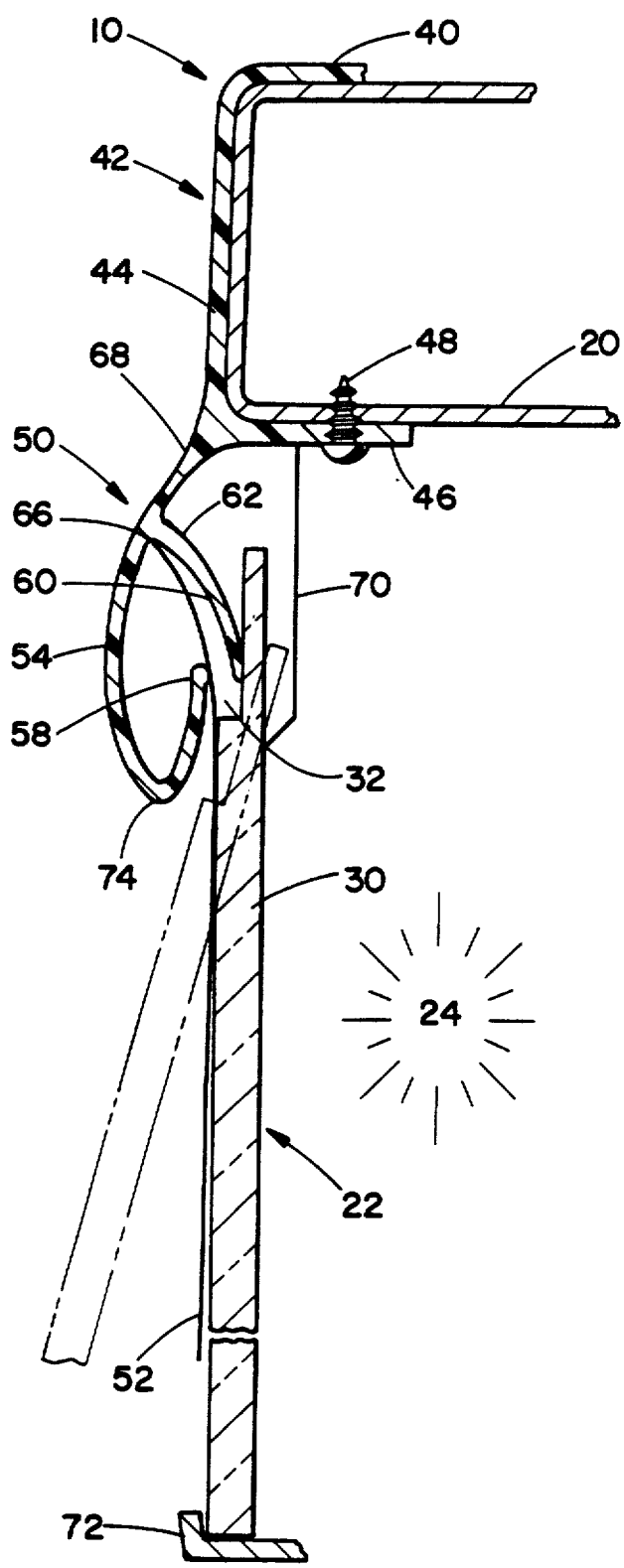
FIG. 1 is a diagrammatic illustration of the present invention attached to a x-ray illuminating cabinet.

With reference to FIG. 1, a light box assembly 10 includes a cabinet 20. A viewing panel 30 is inserted in the front face of the cabinet. A film media hanging means 40 is attached to cabinet 20 for selectively hanging film media on the viewing panel.

The cabinet 20 has a front opening 22 through which a light source 24 transmits light. The front opening 22 may be of varying lengths and the light source 24 uses any conventional lighting device of appropriate strength.

The viewing panel 30 is comprised of an appropriate translucent material such as frosted glass, plastic, or plexiglass, which will allow appropriate illumination. As is discussed below, the preferred embodiment of the viewing panel 30 includes a notch 32 for ease of insertion and removal of the viewing panel 30.

The film media hanging means 40, in the preferred embodiment, is a uni-body or one piece rigid extrusion comprised of plastic or other appropriate material. The film media hanging means 40 includes a securing section 42. In the present embodiment, the securing section includes at least two legs or mounting strips 44,46 separated 90°. The film media hanging means 40 is secured to cabinet 20 through securing means 48, such as a sheet metal screw. It is to be appreciated that many other means for securing the film media hanging means 40 to cabinet 20 are available. For example, a single leg arrangement in which leg 44 is attached by an appropriate securing means such as a screw or bolt. In place of using a screw or bolt various forms of adhesive, two-faced tape, VELCRO, or the like are useable.

The film media hanging means 40 further includes a film receiving means 50 for the receiving and holding sheets of film media 52. A biasing means or connecting strip 54 has a generally "J" shaped channel in cross section initially extending away from viewing panel 30 then curving towards the panel in its lower section, terminating in an engaging edge 58 which is directed toward the panel 20.

A camming surface 60 is mounted on one face of an arm 62 that engagably abuts the front section of the viewing panel 30 in the notch 32. The camming surface 60 is treated or formed such that it has a high coefficient of friction to assist in holding the sheets of film 52. The area of connection between the biasing means 54 and the camming surface 60 creates a film receiving bight 66. The film receiving section 50 is interconnected with the securing section 42 through a connection or bridge section 68. The bridge section 68 is connected to the film receiving section 50 at the area of the film receiving bight 66.

The viewing panel 30 is removably mounted to the cabinet. To mount the viewing panel 30 (as shown by the dotted outline) to the cabinet 20, the viewing panel 30 is tilted and the notch 32 of the viewing panel 30 is slid into the space between a stopping surface, 70 and the side of arm 62 opposite the Camming surface 60. Once the viewing panel 30 is slid up to a height past the bottom end positioner 72, such that the vieWing panel 30 can be slid over the front portion of the bottom end positioner 72, the viewing panel is moved into a generally vertical position. Thereafter, the viewing panel 30 is lowered. Upon lowering the viewing panel such that it rests upon the bottom end positioner 72, the viewing panel is maintained in a secured position by pressure applied from the stopping surface 70, the second edge of the arm 62, and the bottom end positioner 72.

Figure 2:
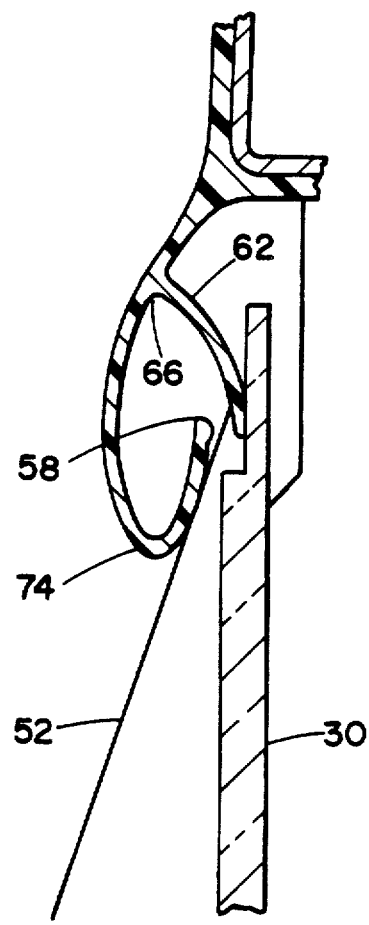
FIG. 2 is a diagram illustrating the insertion of a x-ray film into the present invention.

In FIG. 2, the insertion of a sheet of film is described. The sheet of film 52 having a natural resiliency is inserted into the film media hanging means 40 at an approximate angle of 30° to the viewing panel 30. The film is positioned against a guide surface 74 and is moved in an upward motion. As the film is inserted, the camming surface 60 causes the film to bend or arc outward from the plane of the viewing panel. The film continues to be inserted until the leading edge of the film 52 is received in film receiving bight 66.

At this position, the operator releases the lower end of the film. The film 52 is biased forward by its natural resiliency into firm frictional engagement with the engaging edge 58, as may be seen in FIG. 1. As may be further noted in FIG. 1, the film is held at three distinct points. The first point is at the film receiving bight 66; the second point is at the engaging edge 58; and the third point is at the outer edge of notch 32. These three points are in a non-aligned position such that the engaging edge 58 causes the film to maintain a curved position. The placement of these points utilizes the films' own natural resiliency and its frictional characteristics to maintain it in a secured position for viewing.

As may be noted, there is no movement necessary for the use of the film hanging means 40. Further, there is no clamping of parts Which engage other parts of the apparatus. Therefore, the film media hanging means 40 can securely hold film of varying thickness with the same security.

Removal of the sheet of film 52 is accomplished simply by moving the film in a downward fashion such that it follows the first edge of the camming surface 62 until it is no longer in the film receiving section 50.

Removal of the viewing panel is accomplished by simply reversing the steps necessary to initially mount the panel. Specifically, the panel is moved in an upward fashion and is then swung away from the cabinet 20 such that its bottom edge is above the bottom panel and positioner 72 and is thereafter slid out from the pressure points of the arm and the stopping surface 70.

The invention has been described with reference to the preferred embodiment. Obviously, modifications and alterations will occur to others upon reading and understanding the preceding detailed description of the preferred embodiment. It is intended that the invention be construed as including all such modifications and alterations insofar as they come within the scope of the appended claims or the equivalents thereof.

Having thus described the preferred embodiment, the invention is now claimed to be:

1. A light box assembly for viewing film media, the assembly comprising:
    a cabinet for holding a light source, the cabinet having a generally open front for receiving a translucent viewing panel;
    a viewing panel mounting means for removably mounting the viewing panel at the generally open front of the cabinet;
    a film media hanging means for releasably hanging a sheet of naturally resilient film media of a selected thickness along a front face of the viewing panel, the film media hanging means including:
    an engaging edge fixedly disposed adjacent to a plane of the viewing panel and fixedly displaced therefrom by more than the selected film media thickness such that the film media slides freely therefrom as the film media is slid generally parallel to the viewing panel for insertion,
    a camming means for camming the naturally resilient film media out of the plane of the viewing panel and into engagement with the engaging edge and the viewing panel as the film media is slidingly inserted generally parallel to the viewing panel into the hanging means, the camming means including a camming surface disposed in a fixed, spaced relationship with the engaging edge and adjacent the viewing panel, such that after insertion, the natural resiliency of the film media urges the film media into sufficiently firm functional engagement with the engaging edge, the camming surface, and the viewing panel to hang the film media, the spaced relationship of the camming surface and the engaging edge being greater than the selected film media thickness during the film media's engagement with the engaging edge.

2. The light box assembly as set forth in claim 1 wherein the film media hanging means is a uni-body extrusion.

3. The light box assembly as set forth in claim 2 wherein the uni-body extrusion is formed of rigid material without moving parts.

4. A light box assembly for viewing film media, the assembly comprising:
    a cabinet for holding a light source, the cabinet having a generally open front for receiving a translucent viewing panel;
    a viewing panel mounting means for removably mounting the viewing panel at the generally open front of the cabinet including:
    a panel engaging surface which engagingly abuts the front face of the viewing panel such that the viewing panel is maintained at the generally open front;
    a film media hanging means for releasably hanging a sheet of naturally resilient film media along a front face of the viewing panel, the film media hanging means including:
    a fixed engaging edge disposed adjacent to a plane of the viewing panel,
    a camming means for camming the naturally resilient film media out of the plane of the viewing panel and into engagement with the engaging edge and the viewing panel as the film media is inserted generally parallel to the viewing panel into the hanging means, the camming means including a camming surface disposed adjacent the viewing panel, such that after insertion, the natural resiliency of the film media urges the film media into sufficiently firm functional engagement with the engaging edge, the camming surface, and the viewing panel to hang the film media, the panel engaging surface and the camming surface being defined on opposite faces of a common structure.

5. The light box assembly set forth in claim 1 further including a connecting strip for fixedly mounting the engaging edge facing toward the viewing panel plane.

6. The light box assembly as set forth in claim 5 wherein the connecting strip includes a generally "J" shaped channel extending from a film receiving bight to the engaging edge, a lower section of the "J" shaped channel sloping generally upward toward the viewing panel to guide the leading edge of the film media during insertion.

7. A light box assembly for viewing film media, the assembly comprising:
    a cabinet for holding a light source, the cabinet having a generally open front for receiving a translucent viewing panel;
    a panel engaging surface for engagingly abutting a front surface of a viewing panel, a stopping surface for applying a constant pressure to a back surface of the viewing panel, and a bottom end positioning means for receiving a bottom end of the viewing panel, the panel engaging surface being mounted adjacent the cabinet open front;
    a film media hanging means for releasably handing a sheet of naturally resilient film media along a front face of the viewing panel, the film media hanging means including:
    an engaging edge disposed adjacent to a plane of the viewing panel,
    a camming means for camming the naturally resilient film media out of the plane of the viewing panel and into engagement with the engaging edge as the film media is inserted generally parallel to the viewing panel into the hanging means, the camming means including a camming surface disposed on a common structure with the panel engaging surface adjacent the viewing panel, such that after insertion, the natural resiliency of the film media urges the film media into sufficiently firm functional engagement with the engaging edge, the camming surface, and the viewing panel to hang the film media.

8. The light box assembly as set forth in claim 1 wherein the viewing panel further includes a notch opposite the engaging edge to improve clearance and facilitate film media insertion.

9. An apparatus for releasably hanging a naturally resilient sheet, the apparatus comprising:
a means for defining vertical front face along which the resilient sheet is to be hung;
a hanging means for releasably hanging the resilient sheet along the front face, the hanging means including:
an engaging edge disposed adjacent to an edge of the front face, adjacent to and displaced from a plane of the front face by a distance greater than a thickness of the resilient sheet and
a camming means for camming a leading edge of the sheet against a natural resiliency of the sheet, out of the plane of the front face and urging the sheet into engagement with the engaging edge and the front face as the sheet is inserted generally parallel to the front face into the hanging means, such that after insertion, the natural resiliency of the sheet urges the sheet into firm frictional engagement with the engaging edge, the front face, and the camming surface, wherein the naturally resilient sheet is hung without movement by the engaging edge, the front face, and the camming surface.

10. A one piece extrusion for hanging a resilient sheet along a generally flat face of an associated structure, the extrusion comprising:
an engaging edge extending longitudinally along the extrusion;
a connecting strip extending longitudinally along the extrusion and integrally connected with the engaging edge for mounting the engaging edge horizontally adjacent and displaced forward from a plane of the flat face by more than a thickness of the resilient sheet;
a means for camming the resilient sheet into engagement with the engaging edge and the flat face with the resilient sheet is slidingly inserted generally parallel to the flat face the camming means including a camming surface extending longitudinally along the extrusion, integrally connected with the connecting strip in a fixed, spaced relationship horizontally spaced from and opposite to the engaging edge and angling upward from the plane of the flat face toward and forward beyond the engaging edge such that as the resilient sheet is inserted parallel to the plane of the flat face a leading edge of the sheet is cammed forward out of the plane of the flat face and a front surface of the sheet is urged into frictional engagement with the engaging edge and an obverse surface of the sheet is urged into firm frictional engagement with the flat face and the camming surface.

11. The one piece extrusion as set forth in claim 10 further including a guide surface extending downward from the engaging edge and away from the plane for guiding a leading edge of the inserted sheet toward the camming surface.

12. The one piece extrusion as set forth in claim 11 further including a section which is integrally connected to the guide surface and to an upper end of the camming surface.

13. A uni-body extrusion for hanging naturally resilient film sheets on a film viewing device, the uni-body extrusion comprising:

a securing section for securing the uni-body extrusion to the film viewing device;
a hanging means for releasably hanging naturally resilient film sheets along a viewing panel, the hanging means including:
a connecting strip having an engaging edge, the connecting strip disposed adjacent to one edge of a viewing panel displaced from a plane of the viewing panel by a distance greater than a thickness of one of the resilient film sheets,
a camming means for camming a naturally resilient sheet of film out of the viewing panel plane into engagement with the engaging edge and with the viewing panel as the sheet of film is inserted into the film hanger generally parallel to the viewing panel and,
a film receiving bight formed at an area of connection of the connecting strip and the camming surface for receiving the leading edge of the naturally resilient film, the film receiving bight being positioned in a non-aligned relationship to the engaging edge such that the film is held in a curved position with a front film face urged in engagement with the engaging edge and an obverse face of the film urged into contact with a portion of the viewing panel; and,
a bridge section for connecting the securing section and the film receiving bight.

14. An X-ray film hanger apparatus comprising:
an X-ray viewing device having a cabinet and a viewing panel;
a rigid uni-body extrusion for holding naturally resilient X-ray film including a fixed leg having a "J" shaped configuration in cross section extending outward from the X-ray viewing device wherein a lower section of the leg hooks generally towards the X-ray viewing device, terminating in an engaging edge directed towards the X-ray viewing device;
a camming section having first and second edges disposed adjacent the viewing panel, the first edge of the camming section camming a leading edge of naturally resilient film as the film is inserted generally parallel to the viewing panel into the hanging apparatus such that after insertion the natural resiliency of the film urges the film into firm functional engagement with the engaging edge, and the second edge engagingly abutting the front face of the viewing panel; and
a securing section for securing the extrusion to the X-ray viewing device.

15. A method of hanging film comprising:
removably mounting a viewing panel vertically to a generally open front of a film viewing cabinet;
inserting a sheet of naturally resilient film, generally parallel to a plane of the viewing panel, freely past a stationary engaging edge;
camming a leading edge of the film out of the plane toward the stationary engaging edge and arcing the film against its natural resiliency;
pressing a front face of the film into firm functional engagement with the stationary engaging edge and a portion of an obverse face of the film into frictional engagement with the viewing panel by continuing to cam the leading edge further out of the plane, the natural resiliency of the arced film portion continuing to urge the front face of the film sheet into firm frictional engagement with the stationary engaging edge and the obverse face of the film sheet into firm functional engagement with the viewing panel.

* * * * *